United States Patent
Steuerle et al.

(10) Patent No.: US 6,706,190 B1
(45) Date of Patent: Mar. 16, 2004

(54) METHOD FOR FRACTIONATION OF WATER SOLUBLE OR DISPERSIBLE POLYMERS CONTAINING AMINO GROUPS WITH A BROAD MOLAR MASS DISTRIBUTION

(75) Inventors: Ulrich Steuerle, Heidelberg (DE); Hartwig Voss, Frankenthal (DE); Jürgen Bernbach, Ludwigshafen (DE); Jürgen Decker, Speyer (DE); Rainer Dyllick-Brenzinger, Weinheim (DE); Klaus Lorenz, Worms (DE); Hubert Meixner, Ludwigshafen (DE); Martin Rübenacker, Altrip (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/926,503
(22) PCT Filed: May 9, 2000
(86) PCT No.: PCT/EP00/04140
§ 371 (c)(1), (2), (4) Date: Nov. 13, 2001
(87) PCT Pub. No.: WO00/67884
PCT Pub. Date: Nov. 16, 2000

(30) Foreign Application Priority Data

May 10, 1999 (DE) ......................... 199 21 507

(51) Int. Cl.$^7$ .............................. B01D 61/14
(52) U.S. Cl. .............. 210/651; 210/641; 210/650; 210/805; 528/502 A
(58) Field of Search .................. 210/641, 650, 210/651, 805; 528/502 A

(56) References Cited

U.S. PATENT DOCUMENTS 2,182,306 A 12/1939 Ulrich et al.
3,203,910 A 8/1965 Wilson (List continued on next page.)

FOREIGN PATENT DOCUMENTS

| DE | 2 162 567 | 7/1972 |
| DE | 2 916 356 | 11/1980 |
| EP | 0 411 400 | 2/1991 |

(List continued on next page.)

OTHER PUBLICATIONS

G.B. Guise, et al., Journal of Applied Polymer Science, vol. 30, pp. 4099–4111, "The Chemistry of a Polyamide–Epichlorohydrin Resin (Hercosett 125) Used to Shrink–Resist Wool", 1985.

J. Hiddink, et al., Milchwissenschaft (Milk Science International), vol. 36, No. 11, pp. 657–663, "Effect of Various Pre–Treatments on the Ultrafiltration of Sweet Cheese Whey at About 55° C.", 1981.

Primary Examiner—John Kim
(74) Attorney, Agent, or Firm—Oblon, Spivak, McClelland, Maier & Neustadt, P.C.

(57) ABSTRACT

A process for fractionating water-soluble or water-dispersible amino-containing synthetic polymers having a broad molar mass distribution by ultrafiltration, wherein the polymer solution or dispersion to be fractionated is fed continuously into an ultrafiltration circulation with at least one ultrafiltration unit, and retentate having a narrower molar mass distribution and permeate are discharged continuously, in such a way that the ultrafiltration circulation is essentially in a steady state, the polymers obtainable by this process and their use.

12 Claims, 2 Drawing Sheets

U.S. PATENT DOCUMENTS

| | | |
|---|---|---|
| 3,893,885 A | 7/1975 | Ziemann et al. |
| 4,066,494 A | 1/1978 | Scharf et al. |
| 4,144,123 A | 3/1979 | Scharf et al. |
| 5,009,789 A | 4/1991 | Helmer et al. |
| 5,055,197 A | 10/1991 | Albright et al. |
| 6,056,967 A | 5/2000 | Steuerle et al. |

FOREIGN PATENT DOCUMENTS

| | | |
|---|---|---|
| EP | 0 442 866 | 8/1991 |
| EP | 0 512 175 | 11/1992 |
| WO | WO 94/12560 | 6/1994 |
| WO | WO 94/14873 | 7/1994 |
| WO | 97 25367 | 7/1997 |
| WO | WO 97/25367 | 7/1997 |

METHOD FOR FRACTIONATION OF WATER SOLUBLE OR DISPERSIBLE POLYMERS CONTAINING AMINO GROUPS WITH A BROAD MOLAR MASS DISTRIBUTION

The present invention relates to a process for fractionating water-soluble or water-dispersible amino-containing polymers having a broad molar mass distribution by ultrafiltration, and the use of the polymer contained in the retentate.

Water-soluble amino-containing polymers have long been used as retention aids, drainage aids and fixing compositions in papermaking, as promoters in the sizing of paper with alkyldiketenes, as flocculants for sewage sludges, as adhesion promoters in the production of laminated films, as additives in hair setting and skincare compositions and as compositions for immobilizing anionic active ingredients.

As a rule, such amino-containing polymers are adducts and/or condensates of amino-containing building blocks, such as alkyleneimines, diamines and oligoamines, which may have been reacted with carboxylic acids, carboxylic acid derivatives, polyethers, polyesters and/or crosslinking agents, cf. for example DE-B-1 771 814, U.S. Pat. No. 2,182,306, U.S. Pat. No. 3,203,910, U.S. Pat. No. 4,144,123, EP-A-0 411 400, DE-A-2 162 567, U.S. Pat. No. 4,066,494, DE-A-2 916 356, WO-A-94/12560, WO-A-94/14873 and Journal of Applied Polymer Science, Vol. 30, 4099–4111 (1984).

WO 97/25367 describes a process for preparing water-soluble, amino-containing condensates and adducts by ultrafiltration of aqueous solutions of the condensates or adducts through membranes, from 5 to 95% by weight of the condensates or adducts contained being separated off as permeate. The amino-containing condensates and adducts obtained by this process have a comparatively narrow molar mass distribution and very good performance characteristics as retention aids, drainage aids and fixing compositions in papermaking. The disadvantage of these processes is that the amino-containing adducts and condensates obtained have very high Brookfield viscosity of up to 850 mPas, based on a roughly 15% strength by weight polymer solution, which has an adverse effect on the ultrafiltration process.

EP-B-0 442 866 describes a process for separating and reusing urea/formaldehyde, melamine/formaldehyde and polyamidoamine/epichlorohydrin resins by ultrafiltration. This process is intended to prepare polymers having a high molecular weight and to reduce the concentration of pollutants, such as formaldehyde. The permeate separated off can be worked up, if necessary, before being recycled to the polymer preparation. Also described is a plant for the process, which comprises a polymerization reactor, an ultrafiltration unit and a permeate working-up stage. The ultrafiltration described is a batch procedure, some of the polymer solution being removed from a storage container, subjected to ultrafiltration and then recycled to the container, and the process is repeated until the pollutant content has been reduced to the desired extent or until the desired concentration of the polymer has been reached. The possibility of a continuous procedure is merely indicated, and no further information is given.

The disadvantage of the batchwise process for the ultrafiltration of polymers is that, in order to achieve sufficient separation, the retentate has to be recycled again and again to the product tank until the desired concentration has been reached. After sufficient separation, the product tank must be emptied and filled with fresh starting material and the ultrafiltration must be started and run in again. This leads to downtimes during filling and emptying and to varying product qualities from filtration to filtration. To avoid the downtimes during filling and emptying, a batchwise plant can be operated cyclically by means of two product tanks, i.e. while the ultrafiltration is being carried out from one tank the other tank can be emptied and refilled. However, the additional plants for cyclic operation acquire a large amount of space and are expensive. To ensure a very uniform quality of the separation products, the filter units would have to be cleaned and/or maintained regularly in the case of batchwise operation, i.e. as a rule after every batch. Another disadvantage is the large viscosity and pressure increase toward the end of the ultrafiltration, which results from the increasing concentration of the retentate and requires efficient conveying means and pressure-resistant plants. Furthermore, in the case of high viscosities, either the transmembrane pressure must be increased or the inflow reduced. Both may adversely affect the separation efficiency.

In Milk Science International 36 (11) 1981, J. Hiddink, R. De Boer and P. F. C. Nooy report on investigations into transmembrane flow in the ultrafiltration of whey. The effect of a thermal pretreatment, of pH, of the salt content and of the membrane type used is investigated. A batchwise and continuous ultrafiltration plant were used for the investigation, and no dependence of the results on the continuous and batchwise procedure was found.

It is an object of the present invention to provide a process for fractionating at least partly water-soluble, amino-containing synthetic polymers, which is simple to carry out in practise and leads to an amino-containing polymer having a low viscosity and having at least comparable performance characteristics, such as a good drainage and retention action, in papermaking.

We have found that this object is achieved, according to the invention, by a process for the fractionation of water-soluble or water-dispersible amino-containing synthetic polymers having a broad molar mass distribution by ultrafiltration, wherein the polymer solution or dispersion to be fractionated is fed continuously into at least one ultrafiltration circulation with at least one ultrafiltration unit, and retentate having a narrower molar mass distribution and permeate are discharged continuously, in such a way that the ultrafiltration circulation is essentially in a steady state.

We have surprisingly found that the amino-containing polymers obtained by this process have very good performance characteristics in combination with a lower viscosity. While the polymer transmembrane flow decreases in the batch process at high concentration, in the continuous process a higher polymer, transmembrane flow is surprisingly observed on going over to higher concentrations. Consequently, in the novel process, the relative requirement with respect to membrane area and delivery decreases substantially in comparison with the batch process if the procedure is carried out at high concentration, although the final concentration of the polymer is constant. This makes it possible to save filtration water, and permeates of higher concentration are obtained. As a result, the cost of any required reconcentration of the permeate can be substantially reduced.

Figure 1:
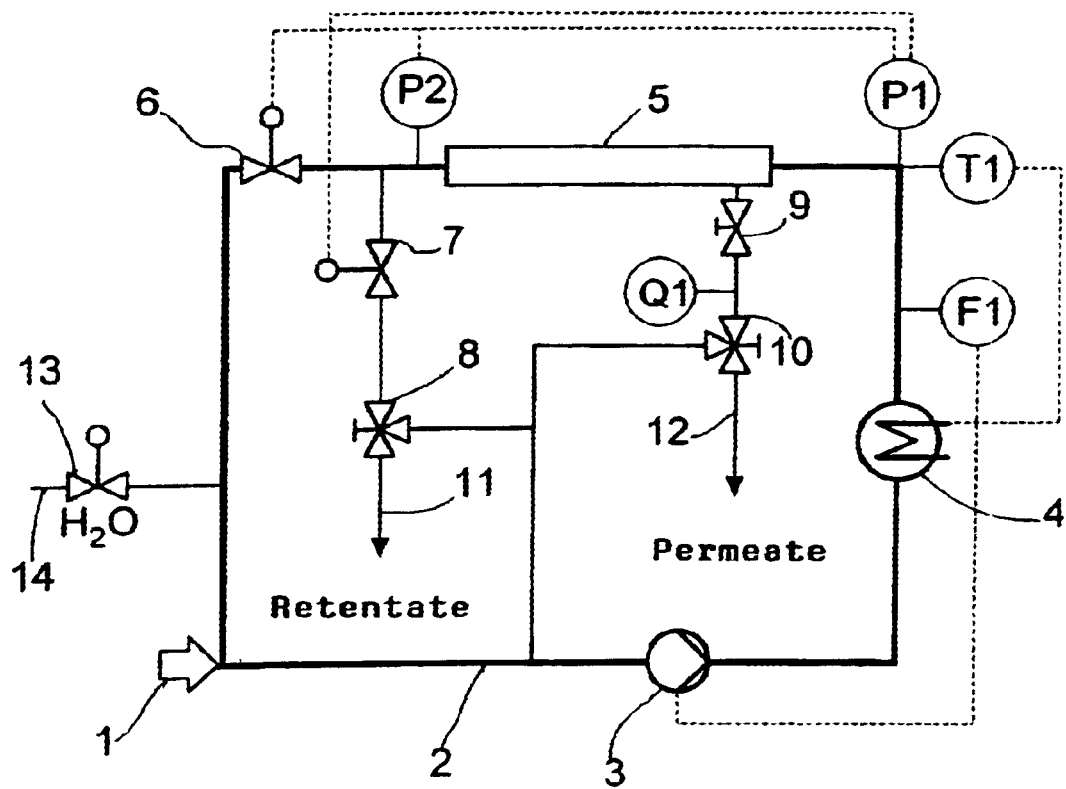
FIG. 1 shows a one-stage ultrafiltration plant suitable for the novel process.

In the novel process, the polymer is fed in an aqueous medium, preferably as an aqueous solution or aqueous dispersion, to an ultrafiltration, and the polymer-containing aqueous medium is separated into retentate and permeate. As a rule, fractionation of the synthetic amino-containing polymers used is achieved, i.e. separation into various portions or fractions which differ in the polymer concentration, polymer composition and/or molecular weight distribution.

The novel process is explained in more detail below with reference to an aqueous polymer solution. All statements accordingly apply to aqueous polymer dispersions.

Ultrafiltration is as a rule a membrane separation process or membrane filtration process which is preferably suitable for the molar mass-dependent separation of dissolved or dispersed substances. Membrane filtration processes include microfiltration, nanofiltration and reverse osmosis. These processes differ essentially in the cut-offs, which depend essentially on the type and porosity of the membranes used. Ultrafiltration and microfiltration, which in the context of this invention are combined under the term ultrafiltration, are particularly suitable for fractionating the synthetic amino-containing polymers in the novel process. Reverse osmosis and nanofiltration are preferably suitable for working up the permeate obtained in the novel process, for example by concentration.

All commercially available membranes which have a cut-off for polymers with molar masses of, for example, from 1000 to 10 million, preferably from 1000 to 500,000, can be used for the ultrafiltration. Membranes having cut-offs for molar masses of from 3000 to 300,000 are particularly preferably used. The cut-off of the membrane used in each case can be adapted to the molecular weight distribution of the water-soluble or water-dispersible amino-containing polymers, which are also referred to below as water-soluble polymers, amino-containing polymers or polymers for the sake of simplicity, so that from 5 to 95%, preferably from 20 to 90, % by weight of the polymer used can be separated off. In the ultrafiltration, low molecular weight fractions of the polymers whose molar mass is below the cut-off are separated off as permeate. High molecular weight fractions of the polymer remain in the retentate. In the context of the present invention, the ultrafiltration also comprises, as described above, microfiltration through membranes, membranes having a mean pore diameter of 0.01 to 10 μm, preferably from 0.05 to 1 μm, in particular from 0.1 to 0.5 μm, being used. By separating off low molecular weight fractions with the permeate, amino-containing polymers in which the fraction of polymer particles having a higher molar mass is increased compared with the polymer used prior to the ultrafiltration are obtained in the retentate. As a rule, polymers which have a narrower molar mass distribution are obtained by this process.

The membranes used may be, for example, in the form of tubes and hollow fibers, plate-and-frame apparatuses, hollow fiber modules or spiral-bound modules. The diameters or channel widths are as rule from 0.5 to 25 mm. In the case of tubes or hollow fibers, diameters of from 0.5 to 2.5 mm are particularly suitable. In the case of filters based on plate-and-frame membranes, such as plate-and-frame apparatuses or spiral-bound modules, channel widths of from 1 to 5 mm are particularly suitable. Suitable materials for the membranes are, for example, regenerated cellulose, cellulose acetate, cellulose triacetate, polyamide, polyacrylonitrile, acrylonitrile copolymers, polysulfone, polyethersulfone, copolymers of vinyl chloride, polyimide, polyvinylidene fluoride, polytetrafluoroethylene, polymethylmethacrylate, hydrolyzed copolymers of ethylene and to vinyl acetate, having a degree of hydrolysis of the vinyl acetate groups of at least 50%, polycarbonate, polyethylene, prepared by the high pressure polymerization of ethylene, and HDPE (very high density polyethylene), polypropylene, carbon, mineral or ceramic membranes and in particular mechanically stable membranes, such as metallic membranes, e.g. stainless steel membranes which may be combined with a secondary membrane. The secondary membrane may consist of titanium oxide or zirconium oxide or one of the abovementioned organic materials, such as polysulfone. Membranes based on polysulfone are preferably used. The summary relating to ultrafiltration and suitable membranes therefor is provided for example by Munir Cheryan in Ultrafiltration Handbook, Technomic Publishing Company, Inc., 1986.

Membranes which are suitable for ultrafiltration are offered by numerous companies, cf. Katalog Internationales Treffen für chemische Technik und Biotechnologie ACHEMA 94, Frankfurt am Main.

An ultrafiltration unit generally comprises one or more modules which are connected in series and/or in parallel and contain the membrane arrangement. The term modules is used when membranes are combined to form larger structures in order to increase the membrane surface for the ultrafiltration. In particular, membranes in the form of tubes or hollow fibers are combined to give modules, for example in the form of hollow fiber modules or spiral-bound modules. An ultrafiltration circulation may have one or more ultrafiltration units arranged in series and/or in parallel (an ultrafiltration circulation having at least one ultrafiltration unit is also referred to below as an ultrafiltration stage). As a rule, an ultrafiltration circulation has at least one conveying means, such as a pump. In the novel process, a plurality of ultrafiltration circulations connected in series, in general from 2 to 10, in particular from 2 to 6, may also be used. An ultrafiltration unit is preferably arranged in each ultrafiltration circulation. Preferably, the ultrafiltration units of a multistage plant have membranes with essentially the same cut-offs. However, the invention is not limited thereto.

Each ultrafiltration circulation of a multistage plant can, if required, have its own pressure and/or flow control. Furthermore, each ultrafiltration circulation may have a controlled feed for essentially polymer-free aqueous medium, which feed can preferably be used for concentration, viscosity, throughput and/or pressure adjustment in the novel process. Parameters used for this controlled feed may be in particular process parameters such as concentration, viscosity, conductivity, pressure, flow rate and/or throughput. Controlled feeding of the aqueous medium can preferably be effected in the feed of all stages. In a further preferred embodiment of the process, the first and/or the last of a plurality of ultrafiltration stages has no such controlled feed. The feed is expediently effected into the line through which the polymer solution is fed into the circulation.

The connection or coupling of the ultrafiltration stages of a multistage ultrafiltration process can be effected at atmospheric pressure or under pressure control via a valve at the inlet or outlet of the ultrafiltration unit. Preferably, the connection of the stages is effected at atmospheric pressure, i.e. the retentate of one ultrafiltration stage serves as feed for the next ultrafiltration stage.

Preferably, the pressure at the inlet of the ultrafiltration unit is brought to from 1 to 20, preferably from 1.5 to 10, particularly preferably from 2 to 5, bar, e.g. about 3 or about 4 bar (inlet pressure).

A transmembrane pressure of from 0.5 to 10, preferably from 1 to 7.5, particularly preferably from 1.5 to 5, bar is preferably established in the ultrafiltration unit.

As stated, an ultrafiltration unit may comprise 1, 2, 3 or more ultrafiltration modules. In the case of modules connected in parallel, the inlet pressure is equal to the mean of the inlet pressures of the respective modules. If a plurality of modules are connected in series, the module inlet pressure is always the inlet pressure at the first module in the direction of flow. In a multistage ultrafiltration, units having a larger diameter or a larger channel width are preferably used in the last stage. For example, a comparable flux can thus be maintained even in the event of an increase in viscosity of the polymer-containing medium in the last stage at a pressure comparable to that in the preceding stages, or a higher flux can thus be achieved in the case of constant viscosity of the polymer-containing medium at comparable pressure. For example, a 1.5- to 3-fold diameter or a 1.5- to 3-fold channel width is suitable.

In the context of this process, a steady state is to be understood as meaning that at least the polymer feed and the retentate discharge are effected continuously, i.e. essentially constantly as a function of time. Preferably, other process parameters essential for the process are also essentially constant as a function of time at any point in the novel process in the aqueous medium which contains the amino-containing polymer. Essential process parameters in the novel process are in particular pressure, temperature, polymer concentration and molar mass distribution.

In the context of the invention, steady state is not to be understood as meaning that the relevant process parameters have to be constant during the entire process or in the entire ultrafiltration plant. For example, the pressure in the aqueous medium is as a rule not equal at all points through the plant but in general is higher in or after the conveying means which conveys the aqueous medium through the plant than, for example, at the outlet of an ultrafiltration unit. The inlet pressure (at the ultrafiltration unit or units) is however likewise essentially constant during the novel process, as is the outlet pressure of the ultrafiltration unit or units. This means that each value or process parameter at one location can differ from the value at another location, but that the value at one location considered over a long period is essentially constant, i.e. is essentially constant as a function of time. In those systems in which starting materials are fed in continuously and product or products is or are removed continuously, the term flow equilibrium or flow equilibrium state is used instead of the term steady state.

Water-soluble or water-dispersible amino-containing polymers which usually have a broad molar mass distribution can be separated by the novel process into polymers which have a narrow distribution and high molecular weight fractions and into polymers having low molecular weight fractions. Amino-containing polymers are known. They are described, for example, in the prior art cited above. The publications stated there are hereby incorporated by reference in their entirety.

These are, for example, a) the reaction products of alkylenediamines or polyalkylenedpolyamines with crosslinking agents containing at least two functional groups, which reaction products are described in, for example, WO 97/25367. Polyethyleneimines thus obtainable have as a rule a broad molar mass distribution and average molar masses Mw of, for example, from 120 to $2 \cdot 10^6$, preferably from 430 to $1 \cdot 10^6$. This group includes polyamidoamines which are grafted with ethyleneimine and crosslinked with bisglycidyl ethers of polyethylene glycols and which are described in the stated U.S. Pat. No. 4,144,123.

b) Reaction products which are obtainable by reacting Michael adducts of polyalkylenepolyamines, polyamidoamines, polyamidoamines grafted with ethyleneimine and mixtures of said compounds and monoethylenically unsaturated carboxylic acids, salts, esters, amides or nitriles with at least bifunctional crosslinking agents. Such reaction products are disclosed, for example, in WO-A-94/184743. In addition to the halogen-containing crosslinking agents, the described classes of halogen-free crosslinking agents are particularly suitable for their preparation.

c) Water-soluble, crosslinked, partially amidated polyethyleneimines which are disclosed in WO-A-94/12560 and are obtainable by Reaction of polyethyleneimines with monobasic carboxylic acids or their esters or anhydrides, acid chlorides or acid amides with amide formation and Reaction of amidated polyethyleneimines with crosslinking agents containing at least two functional groups.

The average molar masses $M_w$ of the suitable polyethyleneimines may be up to 2 million, preferably from 1000 to 50,000. The polyethyleneimines are partially amidated with monobasic carboxylic acids so that, for example, from 0.1 to 90, preferably from 1 to 50, % of the amidatable nitrogen atoms in the polyethyleneimines are present as amido groups. Suitable crosslinking agents containing at least two functional double bonds are stated above. Halogen-free crosslinking agents are preferably used.

d) Polyethyleneimines and quaternized polyethyleneimines. For example, both homopolymers of ethyleneimine and polymers which contain, for example, ethyleneimine (aziridine) grafted on are suitable for this purpose. The homopolymers are prepared, for example, by polymerizing ethyleneimine in aqueous solution in the presence of acids, Lewis acids or alkylating agents, such as methyl chloride, ethyl chloride, propyl chloride, ethylene-chloride, chloroform or tetrachloroethylene. The polyethyleneimines thus obtainable have a broad molar mass distribution and average molar masses $M_w$ of, for example, from 129 to $2 \cdot 10^6$, preferably from 430 to $1 \cdot 10^6$.

The polyethyleneimines and the quaternized polyethyleneimines may, if required, have been reacted with a crosslinking agent containing at least two functional groups (see above). The quaternization of the polyethyleneimines can be effected, for example, with alkyl halides, such as methyl chloride, ethyl chloride, hexyl chloride, benzyl chloride or lauryl chloride, and with, for example, dimethyl sulfate. Further suitable amino-containing polymers whose quality can be improved by ultrafiltration are polyethyleneimines modified by a Strecker reaction, for example the reaction products of polyethyleneimines with formaldehyde and sodium cyanide with hydrolysis of the resulting nitriles to give the corresponding carboxylic acids. These products may, if required, have been reacted with a crosslinking agent containing at least two functional groups (see above).

Phosphonomethylated polyethyleneimines and alkoxylated polyethyleneimines, which are obtainable, for example, by reacting polyethyleneimine with ethylene oxide and/or propylene oxide and are described in WO 97/25367, are also suitable. The phosphonomethylated and the alkoxylated polyethyleneimines may, if required, have been reacted with a crosslinking agent containing at least two functional groups (see above).

The amino-containing polymers are preferably selected from polyalkyleneimines, polyalkylenepolyamines, polyamidoamines, polyalkylene glycol polyamines, polyamidoamines grafted with ethyleneimine and then reacted with at least bifunctional crosslinking agents, and mixtures and copolymers thereof. Polyalkyleneimines, in particular polyethyleneimines, and the derivatives thereof are preferred. Polyamidoamines grafted with ethyleneimine and then reacted with at least bifunctional crosslinking agents are particularly preferred.

The abovementioned amino-containing polymers are selected in particular from the polymers described in DE-B-24 34 816, DE-A-196 21 300 and WO 97/25367. These publications are hereby incorporated by reference in their entirety.

In a preferred embodiment of the novel process, polymers which are obtainable by condensation of $C_2$–$C_{12}$-dicarboxylic acids, in particular adipic acid, with poly(alkylenediamines), in particular diethylenetriamine, triethylenetetramine and tetraethylenepentamine, or mono-, bis-, tris- or tetra(aminopropyl)ethylenediamine or mixtures thereof, grafting of the polyamidoamines, obtained in the condensation, with ethyleneimine and subsequent crosslinking are used. Grafting is preferably effected with an amount of ethyleneimine such that the polyamidoamine contains from 2 to 50, preferably from 5 to 10, ethyleneimine units per basic nitrogen group. The grafted polyamidoamine is crosslinked by reaction with halogen-free, at least bifunctional crosslinking agents, preferably bisglycidyl ethers of polyalkylene glycols. Bisglycidyl ethers of polyethylene glycols having molecular weights of from 400 to 5000, in particular from 500 to 3000, e.g. about 600 or about 2000, are particularly preferred.

The ultrafiltration of water-soluble amino-containing synthetic polymers having a broad molar mass distribution is preferably effected by a procedure in which an aqueous medium having a polymer content of from 3 to 30, preferably from 4 to 15, % by weight is fed continuously into the ultrafiltration and, at the end of the process, a retentate having a polymer content greater than 5, preferably greater than 7, % by weight is discharged continuously from the ultrafiltration circulation. As a rule, the retentate discharged from the ultrafiltration circulation has a polymer content of less than 50, particularly less than 30, particularly preferably less than 20, % by weight. The ultrafiltration of the amino-containing polymers is preferably carried out in such a way that from 5 to 95, preferably from 20 to 90, % by weight of the polymers used are separated off as permeate and the polymers having a higher average molar mass are, if required, isolated from the retentate. The amount of the low molecular weight polymers separated off as permeate is from 30 to 70, % by weight in a preferred embodiment.

In the case of the ultrafiltration, the temperature of the aqueous polymer solutions is as a rule from 0 to 100° C. but may also be more than 100° C., in particular if the ultrafiltration is carried out under pressure. The ultrafiltration is preferably carried out at from 40 to 90° C., particularly preferably from 50 to 70° C. The ultrafiltration is generally carried out at superatmospheric pressure on the retentate side, for example at from 0.5 to 50, preferably from 1 to 30, bar.

In the ultrafiltration, the pH of the aqueous solutions of amino-containing polymer is, for example, as a rule from 2 to 14, preferably from 4 to 13, in particular from 7 to 12.

The novel process is carried out using an ultrafiltration plant which has at least one feed for the aqueous medium (polymer feed) containing the amino-containing polymer to be filtered, at least one ultrafiltration circulation with at least one ultrafiltration unit, means for discharging the permeate, means for discharging the retentate and, if required, conveying apparatuses and feeds for polymer-free aqueous medium (medium feed).

To start up the plant, the ultrafiltration circulation is fed with starting material (i.e. unfiltered polymer-containing aqueous medium) via the polymer feed, and the aqueous polymer-containing medium is circulated. On passing through the ultrafiltration unit, the aqueous polymer-containing medium is separated into permeate and retentate. The retentate remains in the circulation while the permeate is continuously discharged from the circulation. The loss of aqueous medium due to the continuous permeate discharge is compensated by constantly feeding in the starting material and, if required, essentially polymer-free aqueous medium. If required, the distillate obtained from the concentration of the permeate of the polymer fractionation by means of thin-film evaporation or the permeate obtained by means of reverse osmosis can be used as aqueous medium for the ultrafiltration. The aqueous polymer-containing medium is circulated until the desired degree of filtration has been achieved. During the startup, the novel process therefore resembles the prior art processes. Once the desired degree of filtration has been reached in the novel process, retentate having the desired degree of filtration is continuously removed, and starting material and, if required, essentially polymer-free aqueous medium, for example, distillate from the thin-film evaporation or preferably permeate from the reverse osmosis, are fed in constantly in an amount such that the degree of filtration and the retentate discharge remain constant, i.e. the process is now in the steady state. In the steady state, the circulating polymer-containing aqueous medium essentially has the desired degree of filtration and/or the desired concentration, i.e. it is constantly present in a state which corresponds to the final state of the batchwise prior art process.

The continuous retentate discharge, i.e. the amount of retentate which is continuously discharged per unit time from the ultrafiltration circulation, can be controlled by means of various process parameters, e.g. polymer concentration, viscosity, conductivity, throughput, pressure, in particular the inlet pressure of the ultrafiltration unit(s), flow rate, in particular the inflow rate, and the flux.

The discharge is preferably controlled by means of the inlet pressure of the ultrafiltration unit and/or by means of the polymer concentration, for example in the form of an online solids determination of the retentate obtained, alternatively by measuring the polymer concentration and the flow of the polymer (starting material) fed in and of the retentate on discharge from the process. As a rule, the term pressure- or viscosity-controlled discharge is used in the case of the first variant, and the term separation-controlled discharge in the case of the second variant.

As a rule, the water-soluble, amino-containing polymers used in the novel process have a broad molar mass distribution $M_w/M_n$, preferably an $M_w/M_n$ greater than 100, in particular greater than 200, particularly preferably from 300 to 1000. For example, crosslinked polyamidoamines grafted with ethyleneimine may have a molar mass distribution $M_w/M_n$ of about 400. The molar mass distribution is determined by gel permeation chromatography, based on Pullulan standards, using water as eluent. Polymer starting solutions or dispersions having Brookfield viscosities (see below) of from 10 to 1000 mPas are preferred for the novel process. The retentates prepared according to the invention have, for example, viscosities from 20 to 2500, preferably from 50 to 800, particularly preferably from 80 to 300 mPas (measured in a Brookfield viscometer on 10% strength by weight aqueous polymer solutions at 20° C. and pH 10) and a molar mass distribution $M_w/M_n$ of, for example, from 2 to 350, preferably from 10 to 300.

The ultrafiltration is preferably carried out in such a way that the ratio of the molar mass distribution of the polymer fed in to the molar mass distribution of the retentate obtained by the process is greater than 1.1, in particular greater than 1.2, particularly preferably greater than 1.3, e.g. about 1.5, about 2 or about 10.

The novel process for the fractionation of amino-containing polymers by ultrafiltration preferably comprises the following steps:

a) continuous passage of the polymer solution or dispersion to an ultrafiltration unit, b) separation of the polymer solution or dispersion in the ultrafiltration unit into a permeate and a retentate, c) discharge of the permeate from the process, d) discharge of some of the retentate from the process; mixing of the remainder of the retentate with the polymer solution or dispersion in step a) and, if required, essentially polymer-free aqueous medium and passage of the mixture to the ultrafiltration unit.

If the process is carried out in two stages, that part of the retentate which is discharged in d) is preferably subjected to a further fractionation by a process comprising the steps a) to d).

If the novel process comprises more than two stages, the process steps described above are preferably applied in context to the further stages.

The process preferably comprises an upstream startup phase which has the following steps:

a) continuous passage of the polymer solution or dispersion to an ultrafiltration unit, b) separation of the polymer solution or dispersion in the ultrafiltration unit into a permeate and a retentate, c) discharge of the permeate from the process, d) mixing of the total retentate with the polymer solution or dispersion in step a) and, if required, with essentially polymer-free medium and passage of the mixture to the ultrafiltration unit until the desired degree of fractionation has been reached in the retentate.

The low molecular weight polymer fractions separated off as permeate in the fractionation can be recycled to the preparation process for the water-soluble polymers used as starting materials in the ultrafiltration, i.e. they are used for the synthesis of water-soluble, amino-containing polymers having a broad distribution, which can then be again subjected to the ultrafiltration. If the concentration of the permeate of the fractionation (content of amino-containing polymer) is lower than, for example, that desired for recycling to the preparation of the polymers, this permeate can be concentrated, for example by distilling off water, preferably by thin-film evaporation, or by removing water by membrane filtration methods whose membranes preferably have smaller pore diameter than the membranes used beforehand in the fractionation of the polymer. Membrane filtration methods particularly suitable for concentrating the permeate are narrow ultrafiltration, nanofiltration and reverse osmosis. These methods are referred to together below by the term reverse osmosis. The concentration steps can be carried out as part of the novel process or separately in a separate plant. In both cases, the concentration preferably takes place outside the ultrafiltration circulation.

In the reverse osmosis, membranes having a cut-off for electrically neutral molecules of from 50 to 5000 dalton are preferably used. For example, membranes having cut-offs of from 50 to 200 dalton and NaCl retentions of from 50 to 99.9% (generally referred to as reverse osmosis membrane), membranes having cut-offs of from 150 to 2000 dalton and NaCl retentions of from 0 to 60% (generally referred to as nanofiltration membranes) and membranes having cut-offs of from 1000 to 5000 dalton and NaCl retentions of from 0 to 20% (generally referred to as membranes for narrow ultrafiltration) or combinations thereof are suitable. Suitable membrane materials are preferably the abovementioned materials and in particular polymeric materials, such as polyamide, polyimide, polysulfone and polyethersulfone, or nonpolymeric materials, such as ceramic materials, for example based on $Al_2O_3$ or $TiO_2$, or carbon. For example, membranes in the form of tubes, hollow fibers, hollow fiber modules, flat modules or spiral-bound modules are suitable. Suitable membranes are, for example, Desal 3 and Desal 5 from Desal and HO51 from Osmonics. The permeate can be collected prior to concentration and then fed to the concentration stage. Preferably, the concentration of the permeate obtained from the novel continuous process is carried out continuously. In this case, the expensive collection of the permeate in collecting containers can be dispensed with, which represents a saving of time, space and costs compared with the prior art. A one-stage, two-stage or multistage reverse osmosis is particularly suitable for the continuous concentration of the permeate. For this purpose, the continuously obtained permeate stream is fed to the reverse osmosis, preferably at a process pressure of from 10 to 120, particularly from 40 to 70, bar and at a process temperature of from 5 to 150° C., in particular from 10 to 100° C., particularly preferably from 30 to 70° C. The reverse osmosis is preferably carried out at a membrane flux of from 0.05 to 5, in particular from 0.1 to 4, m/s. For carrying out the reverse osmosis on spiral-bound modules, membrane fluxes of from 0.1 to 1.5, in particular from 0.2 to 1, m/s have proven useful. By coupling the novel continuous fractionation by ultrafiltration with a continuous concentration of the fractionation permeate by reverse osmosis, the following further advantages are obtained compared with processes which comprise batchwise ultrafiltration with subsequent concentration of the permeate. Since the permeate discharged from the novel continuous ultrafiltration is obtained essentially in constant amount, constant composition and constant polymer concentration, the subsequent continuous reverse osmosis can be carried out particularly advantageously with regard to, for example, efficiency and easy controllability of the process. Moreover, the concentration requires no reserve capacities, which are required in the batch process due to the constantly changing permeate concentration, composition and amount.

If the permeate is concentrated, for example, a concentration of from 5 to 50, preferably from 10 to 30, % by weight of polymer is established.

In a preferred embodiment of the novel process, a continuous one-stage or multistage ultrafiltration as described above is carried out, and the continuously obtained permeate is fed to a continuous concentration, in particular to a one-stage or multistage concentration by reverse osmosis, in which the permeate of the ultrafiltration is concentrated to a polymer concentration of from 5 to 35, preferably from 10 to 30, % by weight. Particularly advantageously, the concentrate obtained is used for preparing the polymers to be fractionated according to the invention, preferably by grafting with ethyleneimine and subsequent crosslinking with crosslinking agents having at least 2 functional groups, and the polymers thus obtained are subjected to the novel continuous ultrafiltration. The permeate obtained from the reverse osmosis is preferably reused as aqueous medium for the ultrafiltration.

Regarding the continuous multistage ultrafiltration, it has surprisingly been found that, when operating at higher concentration, for example in a four-stage continuous ultrafiltration, the polymer transmembrane flows of the batch procedure can be achieved. The novel process thus has a large number of advantages over a batch process:

lower water demand for the separation higher permeate concentration less effort in concentrating the permeate constant permeate output (no peaks)

Surprising, it has been found that the retentates and permeates obtained by the novel process differ from those obtained in the batchwise ultrafiltration of the prior art, even when the same ultrafiltration units or same ultrafiltration membranes are used in both cases. At the same polymer concentration and same degree of concentration, the retentates prepared by the novel process generally have lower viscosities with the same efficiency.

The present invention therefore furthermore relates to an amino-containing synthetic polymer which is obtainable in the form of a solution, for example in the form of the retentate obtained in the novel ultrafiltration or of a concentrate thereof or in solid form by obtaining the polymer from the retentate.

The polymers obtainable in the form of the retentate are preferably used as retention aids, drainage aids, flocculants and fixing compositions in papermaking. For this purpose, they are added to the paper stock in the usual amounts of, for example, from 0.01 to 1% by weight. Compared with the same amount of amino-containing polymers of the same composition which were prepared by batchwise ultrafiltration, an at least comparable retention and drainage effect is obtained with the fraction of water-soluble, amino-containing condensates and/or adducts remaining in the retentate. Surprising, however, the viscosity of the retentate is considerably lower. The retentate is therefore much easier to handle.

The polymers obtained as retentate are also very useful, in combination with anionic, neutral or cationic high molecular weight polyacrylamides, as retention aids, drainage aids or fixing compositions. Similar systems are disclosed in the literature, cf. EP-A-0 223 223, EP-A-0 235 893 and EP-A-0 335 575.

Combinations of the polymers obtained as retentate with colloidal silica or bentonites or additionally with anionic, neutral or cationic high molecular weight polyacrylamides as a third component are also very particularly useful as retention aids, drainage aids or fixing compositions in papermaking. Processes for the production of paper using cationic assistants which are not subjected to any particular aftertreatment, for example, an ultrafiltration, are disclosed, for example, in EP-A-0 223 223, EP-A-0 235 893 and EP-A-0 335 575. If the retentates obtainable by the novel process are used, a significant improvement in the drainage rate and retention in papermaking is achieved.

The polymer fractions obtained as retentate in the ultrafiltration are also used as flocculants for sewage sludges, as adhesion promoters in the production of laminated films, as additives in hair setting and skincare compositions and as compositions for immobilizing anionic active ingredients, for example in the preparation of medicaments, in crop protection or in material protection, for example, in the preservation of wood.

The retentates obtainable in the ultrafiltration and comprising polyethyleneimines which have an average molar mass Kw of, for example, from $10^5$ to $2 \cdot 10^6$ are preferably used as adhesion promoters for the production of laminated films. Such retentates give stronger bonds having high aging resistance. Since the low molecular weight components are separated from the polyethyleneimines subjected to ultrafiltration, the retentates are particularly suitable as primer for the production of food packaging and as additives in hair setting and skincare compositions.

The examples which follow illustrate the invention without restricting it.

The novel process is initially explained with reference to FIGS. 1 and 2.

In the one-stage ultrafiltration plant of FIG. 1, 1 indicates the feedpoint and the direction of circulation of the aqueous polymer-containing medium. The ultrafiltration circulation 2 comprises a circulation pump 3, an (optional) heat exchanger 4 and an ultrafiltration unit or a membrane module 5 and an outlet 11 for retentate and 12 for permeate. If required, the desired concentration, viscosity and/or the desired pressure can be adjusted by adding aqueous medium via 14 and valve 13. Furthermore, auxiliary means, such as throttle valves 6 and 7 and taps 8, 9 and 10 are present, as well as instrumentation P1, P2, T1 and F1 for pressure, temperature and flow, which controls the throttle valves 6 and 7, heat exchanger 4 and circulation pump 3.

To start up the plant, the circulation 2 is flooded via 1 with the polymer solution to be filtered. The polymer solution is then circulated via the ultrafiltration unit or the membrane module 5, the transmembrane pressure being controlled by means of valve 6. The permeate is discharged freely through tap 10 until the desired concentration of the polymer solution has been reached in the circulation. The retentate discharge 18 then set to free discharge by means of tap 8. The position of the throttle valve 6 at this time is fixed and the inlet pressure before the ultrafiltration unit 5 is kept constant at the value existing at this time by means of the throttle valve 7. In this way, retentate is discharged under pressure control, and the permeate runs out freely. Discharged retentate and permeate are replaced by fresh, unfiltered polymer solution which is sucked in via 1 by the suction of the circulation pump 3.

Figure 2:
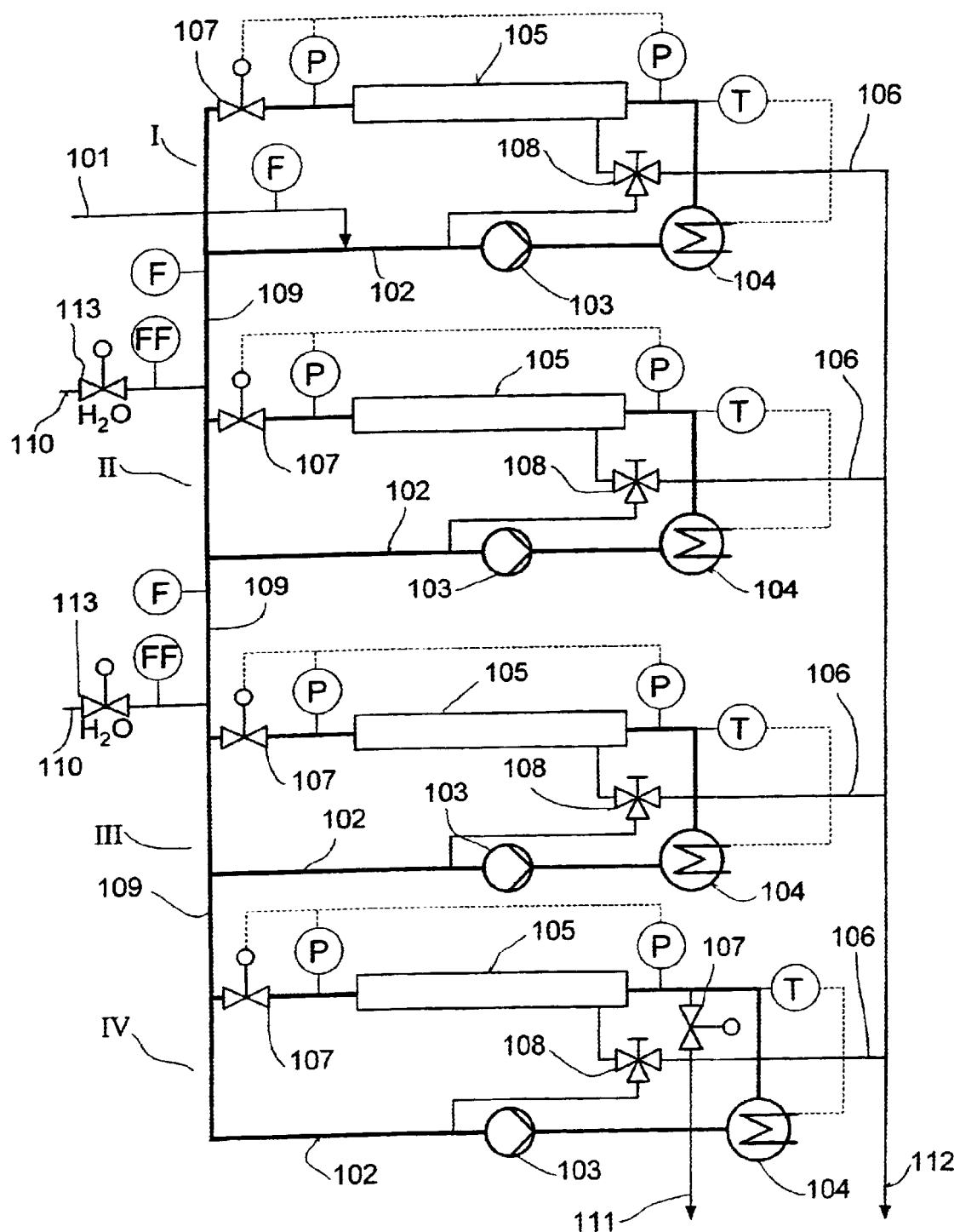
FIG. 2 shows a four-stage ultrafiltration plant which is suitable for the novel process and in which stages I to IV are connected, in series.

In the plant of FIG. 2, 4 ultrafiltration circulations I to IV are connected in series. The aqueous polymer solution is fed in via 101. The ultrafiltration circulation 102 of each stage comprises a circulation pump 103, an optional beat exchanger 104, an ultrafiltration unit or a membrane module 105 and an outlet for the permeate 106. Furthermore, each stage has auxiliary means, such as throttle valves 107, taps 108 and measuring and control instrumentation P, T, F and FF for pressure, temperature and flow (these are indicated by dashed lines). The retentate passes via lines 109 from one ultrafiltration stage into the next ultrafiltration stage and can be adjusted to the desired concentration, viscosity and/or the desired pressure by adding aqueous medium via 110 and the valves 113. The retentate discharge is effected via the outlet 111, and the discharge of the permeate through outlet 112.

Start-up is effected by flooding the plant with the polymer solution to be filtered. This is then circulated in each stage, in each case some of the retentate of stages I to III being fed, via the line 109 into the next stage, until the desired concentration of the polymer solution has been reached in stage IV. The retentate is then discharged under pressure control via the outlet 111, and permeate runs out freely via the outlets 106 and 112. Retentate and permeate are replaced by fresh polymer solution, which is sucked in via 101 by the suction of the circulation pump 103 of the circulation I. If desired, water for dilution can be fed in via the lines 110 and a proportion control FF. The last stage (stage IV) can also be operated as a pure concentration stage.

Otherwise, the following definitions are applicable:

Transmembrane pressure=(pressure at module inlet+pressure at module outlet)/2−pressure on permeate side;

Polymer transmembrane flow=amount of polymer in kg, calculated as solid, which permeates through a filter area of 1 m² per hour;

Inflow rate=(inflowing volume/time) per inflow area;

Inflow area (in the case of hollow fibers)=number of hollow fibers×(internal diameter of fiber/2)²×pi;

Mass transfer=amount of water added, based on the amount of starting solution at the beginning of the ultrafiltration;

In the examples which follow, percentages are by weight, unless stated otherwise.

Unless stated otherwise in the examples, viscosities were measured in a Brookfield viscosimeter at 20° C., a concentration of 10% by weight and a pH of 10.

In the examples in which an ultrafiltration is described, hollow fiber cartridges from A/G-Technology Corp., Needham, Mass., USA, were used, some of which were connected in series; examples of said cartridges are those of the type UFP-100-E-4A (filter area 0.042 m²; hollow fiber diameter 1 mm; length 36 cm), type UFP-500-E-6A and UFP-500-H-6E (filter area 0.56 m² and 0.44 m² respectively; hollow fiber diameter 1 mm and 2 mm, respectively), type UFP-500-E-85 (filter area 8.8 m²; hollow fiber diameter 1 mm), UFP-500-152M (total filter area 18.8 m²; hollow fiber diameter 1 mm). Unless explicitly stated otherwise, the total hollow fiber length was 127 cm.

I. Preparation of the Polymers

Ia. Polymer 1

According to the methods stated in DE-B-24 34 816, Example 3, a polyamidoamine is prepared by condensation of adipic acid with diethylenetriamine and is then grafted in aqueous solution with an amount of ethyleneimine such that the polyamidoamine contains 6.7 ethyleneimine units grafted on per basic nitrogen group. A 10% strength aqueous solution of this polymer (polymer 1a) has a viscosity of 22 mPas. The polymer 1a is crosslinked by reaction with a bisglycidyl ether of a polyethylene glycol having an average molar mass of 2000, according to the data in Example 3 of DE-B-24 34 816. A polymer (polymer 1) containing ethyleneimine units and having a broad molar mass distribution ($M_w/M_n$ of 400) and a viscosity of 120 mPas (determined in 10% strength aqueous solution at 20° C. and pH 10) is obtained. The concentration of the aqueous solution is 12.5% and the pH is 10.

Polymer 2

Polymer 1a (polyamidoamine grafted with ethyleneimine) is crosslinked by reaction with a bisglycidyl ether of a polyethylene glycol having an average molar mass of 600, according to the data in Example 3 of DE-B-24 34 816. A polymer (polymer 2) containing ethyleneimine units and having a broad molar mass distribution ($M_w/M_n$ of 400) and a viscosity of 120 mPas (determined in 10% strength aqueous solution at 20° C. and pH 10) is obtained. The concentration of the aqueous solution is 12.5% and the pH is 10.

II. Comparative Examples

Comparative Example VB1:

Batchwise Ultrafiltration in Dilute Mode (1a) and in Concentration Mode (1b)

3.1 kg of polymer 1 having a solids content of 12.5% were initially taken in a storage vessel. The polymer was pumped by means of a displacement pump at an initial hollow fiber inflow rate of 1.0 m/s via a hollow fiber module having a filter area of 0.04 m², a hollow fiber diameter of 1 mm and a length of 36.2 cm, and the retentate was passed back into the storage vessel. The transmembrane pressure at the beginning of the experiment was regulated to 2.1 bar by means of a valve at the module outlet. After the start of the filtration, the inlet pressure was kept constant at 3.4 bar by adjusting the pump delivery. The temperature in the experiment was 60° C.

1a. During the ultrafiltration, the level in the storage vessel was kept constant by metering further water into the storage vessel, until a mass transfer of 4 was reached, i.e. four times the amount of water, based on the amount of the starting solution at the beginning of the ultrafiltration, had been added. The filtration was then continued without further addition of water, with lowering of the level, and the retentate was thus concentrated. The results of this experiment are summarized in Table 6.

1b. During the ultrafiltration, only 91% of the amount of liquid discharged as permeate were replaced by adding water, i.e. ultrafiltration was carried out with continuous lowering of the level. The results of this experiment are summarized in Table 6.

Comparative Example VB2:

Batchwise Inlet Pressure-controlled Ultrafiltration in Dilute Mode (2a) and Concentration Mode (2b)

Polymer 2 was initially taken in a storage vessel and pumped by means of a displacement pump at a constant hollow fiber inflow rate of 0.5 m/s via hollow fiber modules (filter area 0.56 m², hollow fiber diameter 1 mm, total length 127 cm) and passed back into the storage vessel. The transmembrane pressure was regulated to 2.1 bar by means of a valve at the module outlet during the experiment. Toward the end of the experiment, the inflow rate was reduced to 0.3 m/s, so that the inlet pressure at the module did not exceed 4 bar. The temperature in the experiment was 65° C.

VB2a:

10.3 kg of polymer 2 having a solids content of 12.3% were used. During the ultrafiltration, the level in the storage vessel was kept constant up to a mass transfer of 2.4 by metering further water into the storage vessel. The ultrafiltration was then carried out without addition of water, until the level in the storage vessel was 47% of the initial level. The results of this experiment are summarized in Table 6.

VB2b:

7.74 kg of polymer 2 having a solids content of 16% are initially taken. The metering of water was regulated in such a way that an inlet pressure of 4 bar was present at the ultrafiltration module over the entire duration of the experiment. The ultrafiltration was carried out until the solids content of the retentate was 10.5%, corresponding to a mass transfer of 1.75. The results of this experiment are summarized in Table 6.

Comparative Example VB3:

Batchwise ultrafiltration for achieving a high solids content 2000 kg of polymer 2 were initially taken in a storage vessel and pumped by means of a displacement pump at a constant inflow rate of 0.5 m/s via modules having a hollow fiber diameter of 1 mm, a total length of 127 cm and a total filter area of 64 m² and then passed back into the storage vessel. The transmembrane pressure was regulated to 2.1 bar during the experiment by means of a valve at the module outlet. By metering further water into the storage vessel, the level in the storage vessel was kept constant up to a mass transfer of 2.5. Filtration was then continued without addition of water, until a polymer having a final concentration of 14.5% was obtained. The further results for the experiment are summarized in Table 6.

III. Examples According to the Invention
Example B1:

Continuous Four-stage Ultrafiltration in Dilute Mode (B1a) and in Concentrated Mode (B1b)

In Examples B1a and B1b, a continuous one-stage plant was used for simulating a continuous four-stage plant, and the retentate obtained in each stage was collected and, after adjustment of the concentration with water, was used as starting material for the next stage.

B1a:

The continuous ultrafiltration was carried out with polymer 2 having a solids concentration of 12.5%. Two modules connected in series and having a hollow fiber diameter of 1 mm and a filter area of 0.56 m² were used. The data of the individual stages are summarized in Tables 1 and 6. "PC feed" (PC=polymer concentration) is the polymer concentration of the feed at the inlet of an ultrafiltration stage, "PC bleed" is the polymer concentration of the retentate at the outlet of this ultrafiltration stage and "PC permeate" is the polymer concentration of permeate of this stage. The module inlet pressure of stages 1 to 3 was set at 3.0 ±0.1 bar.

The concentrations in the individual stages are shown in Table 1.

TABLE 1

| Stage | Addition of water water:polymer solution | PC feed | PC bleed | PC permeate | PTMF[1] |
|---|---|---|---|---|---|
| 1 | 1.0:1 | 6.2% | 8.8% | 3.4% | 0.69 |
| 2 | 1.1:1 | 4.2% | 6.9% | 1.7% | 0.42 |
| 3 | 1.2:1 | 3.2% | 5.9% | 1.0% | 0.25 |
| 4 | — | 5.9% | 10.5% | 1.6% | 0.15 |

[1]Polymer transmembrane flow in kg/m²h

TABLE 2

| Stage | Addition of water water:polymer solution | PC feed | PC bleed | PC permeate | PTMF[1] |
|---|---|---|---|---|---|
| 1 | 0.2:1 | 10.6% | 13.2% | 6.8% | 0.86 |
| 2 | 0.7:1 | 7.6% | 10.8% | 3.7% | 0.51 |
| 3 | 0.8:1 | 6.0% | 9.4% | 2.2% | 0.31 |
| 4 | — | 9.4% | 10.8% | 2.1% | 0.19 |

[1]Polymer transmembrane flow in kg/m²h

Further results of this experiment are summarized in Table 6.

Example B2:

Continuous Two-stage Ultrafiltration

The ultrafiltration was carried out analogously to Example B1, except that modules having a filter area of 0.56 m² and a hollow fiber diameter of 1 mm were used in the first stage and modules having a filter area of 0.44 m² and a hollow fiber diameter of 2 mm were used in the second stage. Here, the module inlet pressure of the first stage was set at 4 bar, the transmembrane pressure being 2.1 bar and the inflow being 0.5 m/s. The pressure was kept constant with variation of the starting concentration. The retentates obtained in stage 1 were fed, without further addition of water, into the second stage. The inlet pressure served as setpoint value for regulating the retentate discharge. Under these conditions, five-experiments B2a to B2e were carried out, said experiments differing essentially in the solids content of the retentate obtained. The data for the retentates obtained are summarized in Table 3 and Table 6.

TABLE 3

| | Polymer transmembrane flows of stage 1 and stage 2 | |
|---|---|---|
| | Polymer transmembrane flow Stage 1 in kg/m²h | Polymer transmembrane flow Stage 2 in kg/m²h |
| B2a | 0.47 | 0.16 |
| B2b | 0.42 | 0.12 |
| B2c | 0.40 | 0.12 |
| B2d | 0.35 | 0.11 |
| B2e | 0.31 | 0.07 |
| VB3 | 0.20 (batch) | — |

Example B3:

Continuous Four-stage Ultrafiltration Coupled at Atmospheric Pressure and With Pressure-controlled Retentate Discharge The ultrafiltration was carried out in an apparatus as described in FIG. 2, which however also has, in stage IV, a controlled feed (cf. FIG. 2: 110/113) for aqueous medium. Water was metered into stages II, III and IV via these feeds. Modules having a filter area of 0.56 m² and a hollow fiber diameter of 1 mm were used in each stage, an inflow of the modules of 0.5 m/s being set in stages I to III. A 9% strength by weight solution of polymer 2 was used. The metering, based on the feed (ratio of water to polymer solution) was 0.53 (stage II), 0.62 (stage III) and 0.43 (stage IV). The transmembrane pressure of stages I to III was regulated at 2.2 bar. The retentate was discharged under pressure control by means of the inlet pressure of the last stage (4.8 bar at 0.4 m/s inflow). The results are summarized in IV., Table 4 and Table 6.

IV. Performance Characteristics of the Novel Retentates and Retentates not According to the Invention The retentates obtained in Comparative Example VB3 and novel Examples B2a to B2e and B3 were tested for their suitability as drainage aids and retention aids in papermaking, using two stock models (model 1: non-deinked wastepaper for cardboard and liner; model 2: improved bleached newsprint). The drainage time according to Schopper-Riegler was determined as a measure of the drainage efficiency. The optical transparency of the outflowing white water was used as a measure for the reduction of fibers, crill and fillers. The measurements were carried out with the aid of a photometer from Lange at 340 nm. The results stated below are mean values of these measurements. For each stock model, in 4 measurements, the retention aids and drainage aids were metered in concentrations of 0.05% and 0.1% and 0.15% and 0.2% (novel retentates of Examples B2a to B2e and B3, retentate of Example VB3 not according to the invention) and 0.1% and 0.2% and 0.3% and 0.4% (unfiltered polymer). Using cumulative parameters, the relative amount of retentate used for achieving the same performance as with unfiltered polymer was calculated from these eight measurements, the respective amount of polymer being calculated as solid. The data and results are summarized in Table 4.

TABLE 4

Starting material concentration and product properties after 2 stages

| | Concentration starting material | Separation | Solid retentate | Viscosity retentate[1] | Relative amount used[2] |
|---|---|---|---|---|---|
| B2a | 6.3% | 53% | 14.2% | 183 mPas | 53% |
| B2b | 5.0% | 55% | 13.8% | 190 mPas | 51% |
| B2c | 4.2% | 55% | 13.1% | 198 mPas | 51% |
| B2d | 3.6% | 56% | 12.0% | 159 mPas | 52% |
| B2e | 3.1% | 54% | 10.2% | 102 mPas | 50% |
| B3 | 9.0% | 54% | 10.5% | 136 mPas | 53% |
| VB3 | -(Batch) | 54% | 14.5% | 850 mPas | 53% |

[1] Determined according to Brookfield, 20° C.
[2] Amount of polymer, calculated as solid, for achieving the same performance as with unfiltered starting polymer; the relative amount used was determined for two stock models from the mean value of the measurements of the drainage time according to Schopper-Riegler and the optical transparency of the white waters.

VI. Coupling of the Continuous Ultrafiltration With Continuous Reverse Osmosis A membrane test cell which is suitable for holding flat membranes was used in the laboratory apparatus. The membrane area was 80 cm² and the retentate flow channel was 40 mm wide and 1.2 mm high and was equipped with a spacer. The cell is thus the scale down of a wound module. The cell was integrated into a circulation as follows:
circulation container
high-pressure pump
heat exchanger
cell
pressure relief valve
circulation container
The holdup of the circulation was about 2.5 l.

In the circulation, the throughput through the cell, the temperature and the pressure before and after the cell were measured. The temperature (by means of the heat exchanger), the throughput (by means of the pump speed) and the pressure of the cell (by means of the pressure relief valve) were regulated. The permeate flow was determined by weighing.

Controlled by means of a level control in the circulation container, feed solution (permeate from the fractionation) was fed into the circulation, and retentate was removed from the circulation by means of a controllable pump.

The pump circulation was filled up to the controlled level with feed solution and the reverse osmosis was started. The following process parameters were maintained:
Pressure before the cell=50 bar
Temperature of the circulation=50° C.
Throughput through the cell=66 l/h
(Membrane flux=0.38 m/s)

In a first phase, concentration to the desired final solids content was then effected by removal of permeate and level-controlled metering of further feed solution into the circulation. The plant was then switched over to continuous feed and bleed operation, i.e. permeate and retentate were removed and feed solution was metered in under level control. Removal of the retentate was regulated in such a way that the solids content in the circulation was kept at the desired value.

To simulate a two-stage feed and bleed cascade, retentate was used a second time as feed solution, as described above.

After equilibrium had been established, all measured data for the feed and bleed operation were recorded.

The measured data obtained with the various membranes are shown in Table 5:

TABLE 5

Results of the continuous permeate concentration by means of membrane methods

| | | Start conditions | | Feed and bleed data | | | | | |
|---|---|---|---|---|---|---|---|---|---|
| | | | Permeate | | | | | | |
| | | Feed conc. | flow at feed conc. | Mass flow rate [kg/h] | | | Concentration [%] | | Permeate flow |
| Membrane | Stage | [%] | [kg/m² h] | Feed | Retentate | Permeate | Retentate | Permeate | [kg/m² h] |
| Desal 5DK | 1 | 4.2 | 119 | 0.254 | 0.052 | 0.202 | 20.2 | 0.078 | 25.2 |
| Desal 5DK | 1 | 3.9 | 122 | 0.173 | 0.028 | 0.145 | 23.6 | 0.085 | 18.1 |
| Desal 5DK | 1 | 4.2 | 115 | 0.897 | 0.366 | 0.531 | 10.2 | 0.061 | 66.4 |
| | 2 | 10.2 | 66.4 | 0.396 | 0.198 | 0.198 | 20.4 | 0.077 | 24.8 |
| Desal G 10 | 1 | 3.8 | 73 | 0.201 | 0.039 | 0.162 | 19.3 | 0.099 | 20.2 |
| Osmonics HO51 | 1 | 4.0 | 139 | 0.363 | 0.080 | 0.283 | 16.8 | 0.419 | 35.4 |

NF membrane = Desal 5DK (polyamide), UF membrane = Desal G 10 (polyamide), Osmonics HO51 (polysulfone)

TABLE 6

Results of the polymer fractionation (ultrafiltration)

| | Membrane modules | | | | Polymer content | | | | | | |
|---|---|---|---|---|---|---|---|---|---|---|---|
| | Number of stages | Ø[1] [mm] | Area [m²] | Length [cm] | Starting material [%] | Retentate [%] | PTMF[2] [kg/m²h] | MT[4] | Separation [%] | Mode[3] | Temperature [° C.] |
| VB1a | 1 | 1 | 0.042 | 36.2 | 12.5 | 10.2 | 0.50 | 4.0 | 53 | dil. | 60 |
| VB1b | 1 | 1 | 0.042 | 36.2 | 12.5 | 8.7 | 0.35 | 4.0 | 56 | conc. | 60 |

TABLE 6-continued

Results of the polymer fractionation (ultrafiltration)

| | Membrane modules | | | | Polymer content | | | | Separation | | Temperature |
|---|---|---|---|---|---|---|---|---|---|---|---|
| | Number of stages | Ø[1] [mm] | Area [m²] | Length [cm] | Starting material [%] | Retentate [%] | PTMF[2] [kg/m²h] | MT[4] | [%] | Mode[3] | [° C.] |
| VB2a | 1 | 1 | 0.56 | 127 | 12.3 | 9.7 | 0.53 | 2.5 | 60 | dil. | 65 |
| VB2b | 1 | 1 | 0.56 | 127 | 16 | 10.5 | 0.48 | 1.5 | 56 | conc. | 65 |
| VB3 | 1 | 1 | 64.0 | 127 | 12.5 | 14.5 | 0.20 | 2.3 | 54 | dil. | 65 |
| B1a | 4 | 1 | 0.56 (x4) | 127 | 6.2 | 10.5 | 0.34 | 3.4 | 58 | cont. dil. | 65 |
| B1b | 4 | 1 | 0.56 (x4) | 127 | 10.6 | 10.8 | 0.47 | 1.2 | 54 | cont. conc. | 65 |
| B2a | 2 | 1 and 2 | 0.56 and 0.44 | 127 | 6.3 | 14.2 | 0.32 | 1.0 | 53 | cont. | 65 |
| B2b | 2 | 1 and 2 | 0.56 and 0.44 | 127 | 5.0 | 13.8 | 0.27 | 1.5 | 55 | cont. | 65 |
| B2c | 2 | 1 and 2 | 0.56 and 0.44 | 127 | 4.2 | 13.1 | 0.26 | 2.0 | 56 | cont. | 65 |
| B2d | 2 | 1 and 2 | 0.56 and 0.44 | 127 | 3.6 | 12.0 | 0.23 | 2.5 | 54 | cont. | 65 |
| B2e | 2 | 1 and 2 | 0.56 and 0.44 | 127 | 3.1 | 10.2 | 0.19 | 3.0 | 54 | cont. | 65 |
| B3 | 4 | 1 | 0.56 (x4) | 127 | 9.0 | 10.5 | 0.44 | 1.6 | 54 | cont. conc. | 65 |

[1] Diameter of the hollow fibers
[2] Average polymer transmembrane flow
[3] dil. = dilute; conc. = concentrated; cont. = continuous
[4] MT = mass transfer, standardized to 12% strength starting material solution (required kg H$_2$O per kg of starting material solution)

We claim:

1. A process for the fractionation of water-soluble or water-dispersible synthetic amino-containing polymers by ultrafiltration, wherein the process comprises the following steps:
   a) continuous passage of the polymer solution or dispersion to an ultrafiltration unit, and mixing with retentate recycled from step d) and, optionally, essentially polymer-free aqueous medium,
   b) separation of the mixture in the ultrafiltration unit into a permeate and a retentate,
   c) discharge of the permeate from the process,
   d) discharge of some of the retentate from the process; recycling the remainder of the retentate in step a),
   e) passage of that part of the retentate discharged in d) to at least one further ultrafiltration unit, and treatment thereof by a process comprising the steps a) to d).

2. The process as claimed in claim 1, wherein such comprises a startup phase which has the following steps:
   a) continuous passage of the polymer solution or dispersion to an ultrafiltration unit,
   b) separation of the polymer solution or dispersion in the ultrafiltration unit into a permeate and a retentate,
   c) discharge of the permeate from the process,
   d) mixing of the total retentate with the polymer solution or dispersion in step a) and, optionally, with essentially polymer-free medium and passage of the mixture to the ultrafiltration unit until the desired degree of fractionation has been reached in the retentate.

3. The process as claimed in claim 1, wherein the polymer solution or dispersion has a polymer content of from 3 to 30% by weight.

4. The process as claimed in claim 1, wherein a retentate having a polymer content greater than 5% by weight is discharged.

5. The process as claimed in claim 1, herein from 20 to 90% by weight of the polymer used is separated off as permeate.

6. The process as claimed in claim 1, wherein the ultrafiltration is carried out through membranes having a cut-off for polymers with molar masses of from at least 1000 to 500,000 or through membranes having a pore diameter of from 0.01 to 10 µm.

7. The process as claimed in claim 1, wherein the membranes are used in the form of tubes, hollow fibers, plate-and-frame apparatuses, hollow fiber modules, cushion modules or spiral-bound modules.

8. The process as claimed in claim 1, wherein the ultrafiltration is carried out at an inlet pressure of from 1 to 20 bar.

9. The process as claimed in claim 1, wherein the ultrafiltration is carried out at a transmembrane pressure of from 0.5 to 10 bar.

10. The process as claimed in claim 1, wherein the ultrafiltration is carried out at an inflow of from 0.01 to 10 m/s.

11. The process as claimed in claim 1, wherein ultrafiltration units having a larger diameter or a larger channel width are used in the last stage.

12. The process as claimed in claim 1, wherein the amino-containing polymers are selected from polyalkylenepolyamines, polyamidoamines, polyalkylene glycol polyamines, polyamidoamines grafted with ethyleneimine and then reacted with at least bifunctional crosslinking agents, and mixtures and copolymers thereof.

* * * * *